| United States Patent [19] | [11] | 4,088,601 |
|---|---|---|
| Shane et al. | [45] | May 9, 1978 |

[54] WATER-EMULSIFIABLE DEFOAMER COMPOSITION

[75] Inventors: Hugh J. S. Shane, Guelph; Frederick S. Schell, Kitchener, both of Canada

[73] Assignee: Hart Chemical Limited, Guelph, Canada

[21] Appl. No.: 522,489

[22] Filed: Nov. 11, 1974

[51] Int. Cl.$^2$ .............................................. B01D 17/00
[52] U.S. Cl. ...................................... 252/358; 252/321
[58] Field of Search ................................ 252/358, 321

[56] References Cited

U.S. PATENT DOCUMENTS

| 3,076,768 | 2/1963 | Boylan | 252/358 |
| 3,677,963 | 7/1972 | Lichtman et al. | 252/358 |
| 3,723,342 | 3/1973 | Shane et al. | 252/358 |

*Primary Examiner*—Leland A. Sebastian
*Attorney, Agent, or Firm*—Sim & McBurney

[57] ABSTRACT

Defoamer compositions, from which particulate inorganic solids are substantially absent, are described for use in hot and cold stock pulp mill and paper mill applications. The compositions are water-emulsifiable to form stable emulsions for ease of application in use. The composition contains low viscosity mineral oils, an aliphatic diamide, silicone oil and an ethoxylated alkyl substituted phenol.

57 Claims, No Drawings

WATER-EMULSIFIABLE DEFOAMER COMPOSITION

FIELD OF INVENTION

The present invention relates to defoamer compositions for use in pulp mill and paper mill applications.

BACKGROUND OF THE INVENTION

There are a number of factors to be considered in the formulation of a foam control material for use in controlling foam in pulp mill and paper mill operations and other operations, to eliminate or minimize the interference of foam in the particular operation. A foam control material should have the ability to decrease an already-formed foam to a low level in a short period of time and, additionally, the ability to prevent the formation of foam from the liquor once the material is present, over an extended period of time.

Foaming occurs in pulp and paper mills at a number of locations and many formulations have been suggested to control such foam, with the individual formulations being constructed for the particular location. Such locations include the brown stock washer wherein hot pulp is washed to remove entrained pulping liquor, the screen room wherein the washed pulp from the brown stock washer is subjected to displacement washing and cooling prior to passage to the bleach plant, and the paper making machine wherein the bleached pulp is formed into paper. In the first two locations, foaming occurs in alkaline medium, while, in the latter case, foaming occurs in an acid medium.

To date an effective defoamer composition which can control foam at all these locations and hence is effective over a wide temperature and pH range, has not been commercially available. The present invention provides a defoamer composition which is effective in foam control at each of these pulp and paper mill locations and, additionally is effective in foam control in other applications, including foaming in industrial effluents.

Many of the currently-available defoamer compositions consist predominantly of a mineral oil carrier for the active defoamer. To achieve dispersion of the oil-based material in the aqueous pulp and paper mill liquors to achieve the foam control, various spreading agents have been used. The compositions containing such spreading agents are introduced directly to the aqueous liquor in which the foaming is controlled. This may lead to inefficient utilization of the defoaming composition as a result of uneven dispersion of the compositions in the liquor. Attempts to form oil-in-water emulsions from such defoaming compositions has not met with success.

SUMMARY OF THE INVENTION

The present invention provides a defoamer composition which can readily form an oil-in-water emulsion which is stable for extended time periods. Hence, the defoamer composition may be fed to the aqueous pulp and paper mill liquor in its emulsified form to achieve a ready and uniform dispersion of the defoaming composition resulting in a more efficient defoamer utilization.

In accordance with the present invention, there is provided a defoamer composition substantially free from particulate inorganic solids capable of formation into an oil-in-water emulsion and comprising an aliphatic diamide, a low viscosity mineral oil, a small quantity of a silicone oil and a spreading agent which is an alkoxylated alkyl substituted phenol, and optionally containing an aliphatic oil.

GENERAL DESCRIPTION OF INVENTION

The aliphatic diamide component of the defoamer composition is in essentially finely-divided form and is uniformly distributed throughout the liquid phase. Typical particle sizes are in the range of from 4 to 7 on the Hegman scale, with particle sizes from 5 to 6 on the Hegman scale being preferred.

The aliphatic diamide may be a diamide derivative of a polymethylene diamine containing 2 to 6 methylene groups. The diamides therefore are N, N'-diacyl polymethylene diamines. The amide derivatives are formed with fatty acids and such fatty acids are long chain aliphatic carboxylic acids containing generally from 10 to 22 carbon atoms in the chain.

The acids may contain straight or branched chains, may have a degree of unsaturation, and may contain cycloaliphatic rings. It is not essential that the same fatty acid form the amide group at each of the amino groups of the polymethylenediamine. Usually, however, the diamides used in the present invention are symmetrical.

Typical fatty acids utilizable in the formation of the diamides are capric, lauric, myristic, palmitic, stearic, behenic, lauroleic, oleic, linoleic, linolonic, arachidic, palmitoleic, riccinoleic, petroselenic, vaccenic, oleostearic, licanic, gadoleic, archidonic, cetoleic and erucic acids. Natural mixtures of fatty acids, such as, tall oil acids and tallow fatty acids also may be used.

Examples of polymethylene diamines which may be used to form the aliphatic diamide include ethylene diamine, butylene diamine, hexamethylene diamine and decamethylene diamine, ethylene diamine being preferred.

A particularly preferred diamide component of compositions used in the present invention is ethylene bis-stearamide or N,N'-distearyl ethylenediamine, that is, the diamide formed from stearic acid and ethylene diamine. The diamide is available commercially as "ADVAWAX" (Trademark) 275. This commercially-available form contains the diamide in admixture with other long chain fatty acid diamides. The present invention will be described further with reference to ethylene bis-stearamide or the commercial "ADVAWAX" 275 form.

The quantity of diamide used in the composition depends on a number of factors, such as, the particular amide, the nature of the mineral oil, the quantity of the modifying agents and the type and nature of the aqueous liquor to be treated.

Generally, however, from about 1.5 to about 12% of the total composition of diamide is used. Preferably, quantities of diamide from about 6 to 7% are used.

The oil phase of the defoamer composition in which the active component, i.e. the diamide, is dispersed is a low viscosity mineral oil, or, in one embodiment of the invention, a mixture of oils including the low viscosity mineral oil and an aliphatic oil. A wide variety of mineral oils of wide viscosity range may be used. Generally, the viscosity of the mineral oil should not exceed 100 SUS at 210° F and usually is in excess of 25 SUS at 210° F. Typical oils used in the composition of the invention, therefore, have a viscosity of about 25 to 100 SUS at 210° F. The mineral oils also typically have a viscosity of about 65 to about 215 SUS at 100° F.

A number of commercially-available mineral oils may be used in formulating the composition of the invention. The following Table I provides a list of commercially-available mineral oils with physical and chemical characteristics thereof as known to the applicant from data supplied by the manufacturer.

TABLE I

| Oil Designation | Shellflex 210 | Sunpar 110 | Sunpar 120 | Imperial Oil 846 | Semtol 70 Technical White Oil | Carnation White Mineral Oil N.F. | Ervol Light White Mineral Oil | Blandol Light White Mineral Oil | Bresloil FLA 215 | Bresloil FLA 100 | Bayol 72 |
|---|---|---|---|---|---|---|---|---|---|---|---|
| Physical Properties | | | | 145 to | 65 to | 65 to | 125 to | 80 to | | 95 to | |
| Viscosity, SUS 100° F | 104 | 110 | 208 | 160 | 75 | 75 | 135 | 90 | 215 | 110 | 71 |
| Viscosity, SUS 210° F | 39.6 | 40.3 | 47.4 | 43 | N.A.$^{(1)}$ | N.A. | N.A. | N.A. 48.5 | 39 to 40 | 36.7 | |
| API, Gravity, 60° F | 34.2 | 33.2 | 31.7 | 30.5 | N.A. | N.A. | N.A. | N.A. | N.A. | N.A. | N.A. |
| Specific Gravity, 60° F | 0.8539 | 0.8591 | 0.8670 | 0.873 | 0.840 to 0.850 | 0.830 to 0.845 | 0.860 to 0.870 | 0.845 to 0.860 | 0.87 | 0.86 | 0.86 |
| Density, 20/4° C | N.A. | 0.8554 | 0.8633 | N.A. | N.A. | N.A. | N.A. | N.A. | N.A. | N.A. | N.A. |
| Weight, lbs./gal. | N.A. | 7.153 | 7.219 | N.A. | N.A. | N.A. | N.A. | N.A. | N.A. | N.A. | N.A. |
| Flash Point COC,° F | 395 | 390 | 445 | 390 min. | N.A. | N.A. | N.A. | N.A. | 395 | 350+ | 345 |
| Fire Point, COC,° F. | N.A. | 435 | 500 | N.A. | N.A. | N.A. | N.A. | N.A. | N.A. | N.A. | N.A. |
| Pour Point,° F. | −5 | 0 | 0 | +5 | 20 | 20 | 20 | 20 | 0 | +10 | +15 |
| Colour ASTM D-1500 | 0.5 | 0.75 | 1.25 | 0.5 to 1.0 | 20 to 25 $^{(2)}$ | Water White | Water White | Water White | 3.0 max. | 2.0 max. | +27$^{(2)}$ |
| U.V. Absorptivity, 260 m.u. | N.A. | 0.64 | 0.66 | N.A. | N.A. | 0.1 max. | 0.1 max. | 0.1 max. | N.A. | N.A. | N.A. |
| Molecular weight | N.A. | 370 | 440 | N.A. | N.A. | N.A. | N.A. | N.A. | N.A. | N.A. | N.A. |
| Viscosity Gravity Constant | 0.805 | 0.810 | 0.807 | 0.824 | N.A. | N.A. | N.A. | N.A. | N.A. | N.A. | N.A. |
| Refractive Index | N.A. | 1.4733 | 1.4772 | N.A. | N.A. | N.A. | N.A. | N.A. | N.A. | N.A. | N.A. |
| Refractivity Intercept | N.A. | 1.0456 | 1.0455 | 1.0422 | N.A. | N.A. | N.A. | N.A. | N.A. | N.A. | N.A. |
| Aniline Point ° F | 219 | 216 | 226 | 215 | N.A. | N.A. | N.A. | N.A. | N.A. | N.A. | N.A. |
| Viscosity Index | 97 | 97 to | 100 to | 90 | N.A. | N.A. | N.A. | N.A. | 100+ | 100+ | N.A. |
| Chemical Properties | | | | | | | | | | | |
| Aromatic carbon % | 4.4 | 4 | 4 | 3 | N.A. | N.A. | N.A. | N.A. | 2 | 2 | N.A. |
| Naphthenic carbon % | 27.6 | 29 | 28 | 33 | N.A. | N.A. | N.A. | N.A. | 30 | 30 | N.A. |
| Paraffinic carbon % | 68 | 67 | 68 | 64 | N.A. | N.A. | N.A. | N.A. | 69 | 69 | N.A. |
| Polar compounds wt. % | 0.2 | 0.3 | 0.3 | 1 | N.A. | N.A. | N.A. | N.A. | 0.3 to 1.4 | 0.7 | N.A. |
| Aromatics wt. % | 9.8 | 11.9 | 13.5 | 18 | N.A. | 0 | 0 | 0 | 10.3 to 18.3 | 12.7 | N.A. |
| Saturates wt. % | 90.9 | 87.8 | 86.2 | 81 | N.A. | N.A. | N.A. | N.A. | 80 to 90 | 86.6 | N.A. |
| Asphaltenes wt. % | 0 | 0 | 0 | N.A. | N.A. | N.A. | N.A. | N.A. | 0 | 0 | N.A. |

Notes:
$^{(1)}$The designation N.A. indicates not available from the manufacturer.
$^{(2)}$Saybolt Colour Of the mineral oils identified in the above Table I, it is preferred to use Shellflex 210. While manufacturers' specifications of the above-identified products may change after the date of this application, the applicants intend there to be used mineral oils having the characteristics listed in the above Table I.

Chemical characteristics of mineral oils which may be used in the compositions of the invention may be summarized as follows:

| Paraffinic carbon | about 60 to about 70% |
|---|---|
| Naphthenic carbon | about 25 to about 35% |
| Aromatic carbon | about 1 to about 5% |
| Saturates | about 75 to about 95% wt. |
| Aromatics | about 5 to about 20% wt. |
| Polar compounds | Less than about 1.5 wt.% |

The aromatics content of the composition may be decreased in accordance with the further embodiment discussed below where an additional aliphatic oil is present.

The silicone oil which is used in the compositions of the invention may be any convenient silicone oil, for example, a dimethyl polysiloxane, such as that known as Antifoam A, a thixotropic dimethyl polysiloxane typically having a viscosity at 25° C of about 3100 to 3300 centistokes, or that known as Dow Corning 200 Fluid, a 50 centistokes viscosity dimethyl polysiloxane. A small quantity of the silicone oil is used, generally less than about 2%, typically about 0.4 to 0.5%.

As mentioned above, the defoaming composition of the invention contains, as a spreading agent, an alkoxylated alkyl substituted phenol. Such materials may be depicted by the formula:

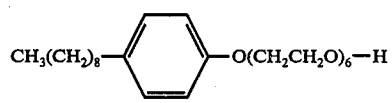

where R is an alkyl group, typically containing from 8 to 10 carbon atoms, particularly th n-nonyl group, usually located in the para-position to the oxygen, R' is an alkyl group containing two or three carbon atoms, especially two carbon atoms, and n is a value from greater than 4 to less than about 8, preferably about 6.

As the alkoxylated alkyl substituted phenol, it is preferred to use an ethoxylated p-nonyl phenol containing about 6 ethylene oxide groups. This material may be designated:

$$CH_3(CH_2)_8 - \bigotimes - O(CH_2CH_2O)_6 - H$$

This product is available in a commercial form, sold under the designation "REXOL" (Trademark) 25/6.

The quantity of alkoxylated alkyl substituted phenol used in the composition of the present invention may vary widely, depending on the quantities and nature of the other components of the composition. Quantities of from about 1 to about 8% by weight of the total composition typically may be used, preferably about 4.5 to about 5.5% by weight.

The presence of the alkoxylated alkyl substituted phenol in the composition of the invention allows the ready formation of an oil-in-water emulsion from the composition. Such oil-in-water emulsions are quite stable at normal temperatures and do not exhibit phase separation over at least a 24-hour period, exhibiting only a minor formation of a thicker layer on the surface of the emulsion during this period. This property allows the provision of the composition of the present invention in a physical form, namely, the oil-in-water emulsion, which permits the composition to be introduced to the aqueous medium in which foam control is to be carried out, in a very convenient manner for rapid and uniform dispersion of the active defoaming components in the aqueous medium.

Compositions of the present invention in accordance with one embodiment thereof, therefore, essentially require the presence of the following components in the designated quantities:

| | |
|---|---|
| Aliphatic diamide of particle size 4 to 7 on the Hegman scale | about 1.5 to about 12% |
| Silicone oil | Small quantity |
| Alkoxylated alkyl substituted phenol | about 1 to about 8% |
| Low viscosity mineral oil | Balance |

At least one additional spreading agent may be present in the composition of the invention, usually in a quantity up to about 3% by weight of the composition, typically about 1%. The additional spreading agent may be any convenient anionic, cationic or non-ionic surfactant. Examples of suitable anionic surfactants are fatty acids containing from 12 to 22 carbon atoms and soaps of the fatty acids. Other suitable anionic surfactants include alkali metal and alkaline earth metal salts of alkyl-aryl sulfonic acids and sulfated or sulfonated oils.

The additional spreading agent, when used, preferably is a petroleum sulphonate of molecular weight from about 400 to about 600, such as a calcium petroleum sulphonate. Calcium petroleum sulphonates are commercially-available, a typical such product being Surchem 306, typically having a molecular weight of about 440.

Suitable cationic surfactants include salts of long chain primary, secondary or tertiary amines and quaternary salts.

Non-ionic surfactants also may be used and examples include condensation products of higher fatty alcohols with ethylene oxide, condensation products of fatty acid amides with ethylene oxide, polyethylene glycol esters of long chain fatty acids, ethylene oxide condensates of polyhydric alcohol partial higher fatty acid esters and their inner anhydrides, long chain polyglycols in which one hydroxyl group is esterified with a higher fatty acid and the other hydroxyl group is etherified with a low molecular weight alcohol. Additional non-ionic surfactants include sorbitans, "SPAN" (Trademark)'s, "TWEEN" (Trademark)'s, lecithin and ethoxylated lecithin.

A preferred composition in accordance with this embodiment of the present invention, utilizing the currently commercially-available materials and including an additional spreading agent, has the following formulation:

| | | |
|---|---|---|
| Advawax 275 | about | 6.7% |
| Surchem 306 | about | 1.0% |
| Antifoam A | about | 0.5% |
| Rexol 25/6 | about | 5.1% |
| Shellflex 210 | about | 86.9% |
| Total | | 100.0% |

In some instances, the composition formulated as described above exhibits a thickening tendency which may impair its pumpability in cases where it is not proposed first to form an oil-in-water emulsion from the composition before use. In accordance with a second embodiment of this invention, the viscosity characteristics of the composition are varied by adding to the composition or substituting for part of the low viscosity mineral oil a very low viscosity substantially wholly-aliphatic oil.

The use of a substantially wholly aliphatic oil in this way varies the ratio of aliphatic to aromatic components in the composition and decreases the overall viscosity to provide a pumpable composition.

The quantity of aliphatic oil may vary over a wide range, although the quantity is maintained below the level above which phase separation occurs in the composition. The aliphatic oil, preferably having a viscosity of about 50 centistokes, is used in a quantity sufficient to provide a typical formulation viscosity of about 400 to about 1000 centipoise. Typically, quantities of from about 3 to about 9% of the total weight of the composition are used, preferably around about 5 to about 7%.

The compositions of this invention containing the aliphatic oils often provide an additional defoaming action to that obtained by the compositions of the invention which do not contain such aliphatic oils.

The aliphatic oil preferably is substantially odorless to prevent the imparting of odor to the pulp or paper product, particularly the latter. Further, the aliphatic oil generally has a high flash point, typically greater than about 120° F, to avoid any fire hazard resulting from the use of low flash point materials.

Aliphatic oils are commercially-available and these oils may be used in the compositions of this second embodiment of the invention. A typical such oil is that known as Shell Base Oil 50. This particular oil has the typical properties recited in the following Table II:

TABLE II

| | |
|---|---|
| Specific Gravity | 0.766 |
| Viscosity SSU 100° F | 38.5 |
| Colour Saybolt | +30 |
| Flash Point ° F (TCC) | 125 |
| Aniline Point ° F | 189 |
| K.B. value | 24 |
| U.M.R. %v | 97 |
| Distillation | |
| I. B.P.° F | 362 |
| 10% recovered | 376 |
| 20% recovered | 378 |
| 30% recovered | 382 |
| 40% recovered | 384 |
| 50% recovered | 388 |
| 60% recovered | 392 |
| 70% recovered | 398 |
| 80% recovered | 414 |
| 90% recovered | 452 |
| E.P. | 528 |
| Aromatics % vol. | 0 |
| Olefins % vol. | 0 |

The compositions in accordance with this second embodiment of the invention therefore may comprise:

| | |
|---|---|
| Aliphatic Diamide of particle size 4 to 7 on Hegman scale | about 1.5 to about 12% |
| Silicone oil | Small quantity |
| Alkoxylated alkyl substituted phenol | about 1 to about 8% |
| Aliphatic oil | about 3 to about 9% |
| Low viscosity mineral oil | Balance |

A typical preferred formulation in accordance with this embodiment of the invention, utilizing the currently commercially-available materials, consists of:

| | | |
|---|---|---|
| Advawax 275 | about | 6.2% |
| Surchem 306 | about | 0.9% |
| Antifoam A | about | 0.5% |
| Rexol 25/6 | about | 4.8% |
| Shell Base Oil 50 | about | 6.0% |
| Shellflex 210 | about | 81.6% |
| Total | | 100.0% |

If desired, the compositions of this second embodiment of the invention may be formed into oil-in-water emulsions prior to their use, in common with those of the first embodiment.

The compositions of the invention have been found to be effective defoaming compositions in a wide variety of pulp mill and paper mill applications, being effective in brown stock washing, screen room and paper making machine foam control operations, thereby exhibiting effectiveness over a wide range of pH, typically from pH4 to pH12.

The compositions of the invention exhibit their activity over a wide range of temperatures, enabling their use in the plurality of locations noted above. Effectiveness is exhibited over a temperature range of about 32° F to about 180° F and higher, up to the boiling point of the liquor, thereby exhibiting a versatility not heretofore realized with commercially-available defoamer compositions.

The quantity of defoaming composition utilized in the pulp mill operations may vary widely, depending on the components used, the severity of the foaming problem and the location of use. Typical quantities of defoaming compositions utilized are from 0.5 to about 2 lbs. per ton of pulp in brown stock washer and screen room uses, and from about 0.5 to about 3 lbs. per ton of dry pulp in paper making machine operations.

In addition to utility in a variety of pulp mill operations, the compositions of the invention have been found to be useful in the control of foam in a variety of foamable industrial effluents, for example, liquid effluents from textile or paper mills and from tanneries.

The compositions of the invention have a long shelf life, exhibiting little tendency for the solid phase to separate from the mineral oil upon standing for a period of time.

The compositions of the present invention may be produced in any convenient manner, such as by mixing the ingredients, or heating the diamide above it melting point, incorporating the melt into the oil, and then cooling. Preferably, the method described in U.S. Pat. No. 3,730,907 is utilized, since the compositions obtained thereby have superior shelf-life and antigelling properties.

The alkoxylated alkyl substituted phenol, alone in the first embodiment and together with the aliphatic oil in the second embodiment, may be incorporated in the original batch of ingredients or added to the composition following the ageing step described in the above-mentioned U.S. Pat. No. 3,730,907, as desired.

EXAMPLES

The invention is illustrated by the following Examples.

EXAMPLE 1

This example illustrates the formation of compositions in accordance with this invention.

A 6000 lb. batch of materials consisting of 420 lbs. of Advawax 275, 60 lbs. of Surchem 306, 30 lbs. of Antifoam A and 5490 lbs. of Shellflex 210 was charged to a kettle. The batch was cycled through a Microflow mill until the average particle size of the Advawax 275 was about 5 to 5½ on the Hegman scale, while the temperature of the mill effluent was maintained at about 35° to 45° C.

The composition after milling was transferred to a further kettle and the batch was heated to about 45° C with agitation and the batch was maintained at approximately 45° C with continued agitation for 6 hours. At the end of this time, the temperature of the batch was raised to 60° C for one hour and agitation was continued. Following heating at 60° C, the batch was rapidly cooled to room temperature.

To the composition formed in this way was added 325 lbs. of Rexol 25/6 based on the total weight of the batch to provide a composition (A) containing:

| | | |
|---|---|---|
| Advawax 275 | 420 lbs. | (6.7%) |
| Surchem 306 | 60 lbs. | (1.0%) |
| Antifoam A | 30 lbs. | (0.5%) |
| Rexol 25/6 | 325 lbs. | (5.1%) |
| Shellflex 210 | 5490 lbs. | (86.9%) |

To a portion of composition (A) having a viscosity of about 1300 cps, was added 6% of Shell Base Oil 50, based on the total quantity of the portion of composition (A), to provide a composition (B) having a viscosity of about 700 cps and containing approximately:

| | |
|---|---|
| Advawax 275 | 6.2% |
| Surchem 306 | 0.9% |
| Antifoam A | 0.5% |
| Rexol 25/6 | 4.8% |
| Shell Base Oil 50 | 6.0% |
| Shellflex 210 | 81.6% |

Compositions (A) and (B) were found to have excellent shelf-life, as observed by only a minor tendency to separate into their components over a long period of time. Composition (A) exhibited an increase in viscosity on standing but composition (B) did not possess this tendency.

EXAMPLE II

This example illustrates the emulsifiable properties of the compositions formed in Example 1.

Separate samples of compositions (A) and (B) were placed in water in quantities of about 5% v/v of the water and shaken therewith. Immediately there were obtained milky white oil-in-water emulsions. Upon standing for a 24-hour period, a gradual formation of a thicker layer on the surface of the emulsions was observed, although the emulsions remained milky white. Mild agitation rapidly dispersed the thicker layer and the original appearance of the emulsions was restored.

A sample of the composition formed by the process outlined in Example I prior to addition of the Rexol 25/6 was also shaken with water to form an emulsion. While some emulsification was observed, upon standing the emulsion separated in water and oil phases very rapidly, separation being substantially complete in a matter of minutes.

Additional compositions were formed by the procedure of Example I, substituting various surfactants in quantities from 1 to 5% for the Rexol 25/6. In each case, an attempt was made to form a 5% v/v emulsion of the composition in water. The compositions failed to provide a stable oil-in-water emulsion. These results show the necessity of employing very specific surface active or spreading agents in the formulations of the invention to obtain stable oil-in-water emulsions. A list of the surfactants tested follows in Table III:

TABLE III

| Commercial Designation | Chemical Identity as known |
|---|---|
| "PLURONIC" (Trademark) L62D | Ethylene oxide-propylene oxide copolymer |
| Pluronic L61 | " |
| Pluronic L62LF | " |
| "NONEX" (Trademark) DL2 | Polyoxyethylene (200 M.W.) dilaurate |
| Nonex D04 | Polyoxyethylene (400 M.W.) dioleate |
| Sulfate 4604 | Sulfated sperm oil sodium salt |
| — | Glyceryl mono-oleate |
| — | Sorbitan mono-oleate |
| "ESTEROL" (Trademark) 1090 | Sorbitan monolaurate plus 20 moles of ethylene oxide |
| Rexol 25/26 | Nonyl phenol plus 8 moles of ethylene oxide |
| Rexol 25J | Nonyl phenol plus 9 moles of ethylene oxide |
| Rexol 25/4 | Nonyl phenol plus 4 moles of ethylene oxide |
| Rexol 2000 | Sperm oil monoethanolamide containing 46% ethylene oxide |
| Rexol 8001 | Tallow fatty acids monoethanolamide containing 56% ethylene oxide. |

EXAMPLE III

This example illustrates the use of composition (A), prepared as outlined in Example I, as a defoamer in brown stock washer defoaming operations on a variety of black liquors from Kraft pulp mill operations.

An experimental foam property testing apparatus was set up. The apparatus consisted of a 4½-gallon battery jar full of water, immersed in which was a thermostatically-controlled immersion heater, a thermometer, an agitator and a cylindrical glassware holding vessel for black liquor. For evaluation of compositions, the black liquor was recycled through a small gear pump from the bottom back to the top of the holding vessel, re-entering the vessel through a small spray nozzle. Certain standard parameters were chosen, including a recycle pump rate of 2320 mls/min and a standard black liquor charge of 500 ccs at 180° F.

In making tests of defoaming characteristics, the water bath was heated to about 180° F and maintained at this temperature throughout. The 500 ccs of black liquor to be treated, also heated to 180° F, were poured into the holding vessel and the recycle pump was started. As the black liquor recycled through the system, a head of foam was formed in the holding vessel.

As soon as the foam height reached 3 inches, exactly 0.03 mls or exactly 0.04 mls of defoamer composition was syringed into the recycle stream. The effect of the addition on the foam was observed by taking foam height readings every 5 seconds for the first 35 seconds, every 10 seconds up to 60 seconds and then every 20 seconds.

The results obtained using composition (A) (Example 1) on a variety of blackk liquors are reproduced in the following Table IV:

TABLE IV

Brown stock Defoamer Results (Foam height in inches) BLACK LIQUOR

| Time (secs) | A (0.04 ml) | B (0.04 ml) | C (0.03 ml) | D (0.03 ml) | E (0.03 ml) | F (0.03 ml) | A (no defoamer) |
|---|---|---|---|---|---|---|---|
| 0 | 3 | 3 | 3 | 3 | 3 | 3 | 3 |
| 5 | 2 | 1.75 | 1.75 | 2 | 2.5 | 1.5 | 4.75 |
| 10 | 0.8 | 0.6 | 1.25 | 0.75 | 2.25 | 0.7 | 6.5 |
| 15 | 0.75 | 0.6 | 1.25 | 0.6 | 2.0 | 0.7 | 7.25 |
| 20 | 0.75 | 0.6 | 1.3 | 0.6 | 1.8 | 0.7 | |
| 25 | 0.75 | 0.75 | 1.3 | 0.6 | 1.75 | 0.7 | |
| 30 | 0.75 | 0.75 | 1.5 | 0.75 | 1.75 | 0.7 | |
| 35 | 0.75 | 0.75 | 1.6 | 0.85 | 1.8 | 0.7 | |
| 40 | 0.75 | 0.8 | 1.75 | 1.0 | 2.0 | 0.7 | |
| 50 | 0.8 | 1.0 | 2.0 | 1.2 | 2.0 | 0.8 | |
| 60 | 0.8 | 1.25 | 2.25 | 1.25 | 2.2 | 0.9 | |
| 80 | 1.2 | 1.5 | 2.75 | 1.3 | 2.5 | 0.9 | |
| 100 | 1.75 | 1.8 | 3.25 | 1.5 | 3.1 | 0.9 | |
| 120 | 2.75 | 2.3 | 3.5 | 1.85 | 3.5 | 1.0 | |
| 140 | 4.5 | 3.5 | 4.0 | 2.6 | 4.0 | 1.2 | |
| 160 | 5.75 | 4.5 | 4.3 | 3.5 | 4.25 | 1.25 | |
| 180 | 6.75 | 5.5 | 4.6 | 4.6 | 5.0 | 1.3 | |
| 200 | 7.25 | 6.75 | 4.75 | 5.5 | 5.5 | 1.3 | |
| 220 | | | 4.8 | 6.5 | 5.75 | 1.5 | |
| 240 | | | 5.0 | | 6.5 | 1.6 | |

The results of the above Table IV indicate that for a variety of different pulp mill black liquors composition (A) rapidly decreases the original foam head and inhibits the formation of a foam over an extended period.

EXAMPLE IV

This example illustrates the use of composition (A) formed by the procedure of Example I as a defoamer in pulp mill screen room operations.

The foaming evaluation procedure outlined in Example III was repeated, with the exception that the temperature was maintained at 110° F and screen room liquor was simulated by forming a dilute solution of 50 mls or 100 mls of Kraft mill black liquor in a gallon of water.

Tests were carried out in some cases using 0.02 mls of defoamer and others using 0.04 mls of defoamer. Comparative results from a commercially-available competitive product (C.P.) were obtained.

The results obtained are reproduced in the following Table V:

TABLE V

Screenroom Defoamer Results Foam Height/inches

| Black Liquor Time (secs.) | I (50 ml/gal) 0.04 ml Comp.A | C.P. | II (50 ml/gal) 0.02 ml Comp.A. | C.P. | III (100ml/gal) 0.04 ml Comp.A | C.P. |
|---|---|---|---|---|---|---|
| 0 | 3 | 3 | 3 | 3 | 3 | 3 |
| 5 | 0.25 | 0.2 | 0.75 | 1.9 | 1.4 | 3 |
| 10 | 0.5 | 0.25 | 0.3 | 1.25 | 1.0 | 3 |
| 15 | 0.5 | 0.25 | 0.4 | 0.75 | 1.0 | 2.75 |
| 20 | 0.5 | 0.25 | 0.5 | 0.6 | 1.0 | 2.5 |
| 25 | 0.75 | 0.25 | 0.5 | 0.5 | 1.0 | 2.25 |
| 30 | 0.75 | 0.5 | 0.5 | 0.4 | 1.0 | 2.15 |
| 35 | 1.0 | 0.5 | 0.5 | 0.25 | 1.2 | 2.1 |
| 40 | 1.25 | 0.75 | 0.5 | 0.2 | 1.0 | 2.1 |
| 50 | 1.5 | 1.0 | 0.5 | 0.2 | 1.0 | 2.0 |
| 60 | 1.5 | 1.25 | 0.5 | 0.25 | 1.0 | 1.6 |
| 80 | 1.5 | 1.75 | 0.5 | 0.4 | 1.2 | 1.5 |
| 100 | 1.75 | 2.5 | 0.6 | 0.4 | 1.2 | 1.4 |
| 120 | 1.75 | 2.75 | 0.75 | 0.5 | 1.25 | 1.4 |
| 140 | 1.75 | 3.0 | 0.75 | 0.6 | 1.25 | 1.4 |
| 160 | 1.85 | 3.0 | 0.75 | 0.75 | 1.3 | 1.4 |
| 180 | 1.85 | 3.0 | 0.75 | 0.7 | 1.5 | 1.4 |
| 200 | 2.0 | 3.0 | 0.8 | 0.75 | 1.5 | 1.4 |

TABLE V-continued

| | Screenroom Defoamer Results Foam Height/inches | | | | | |
|---|---|---|---|---|---|---|
| Black Liquor Time (secs.) | I (50 ml/ gal) 0.04 ml Comp.A | C.P. | II (50 ml/ gal) 0.02 ml Comp.A. | C.P. | III (100ml/ gal) 0.04 ml Comp.A | C.P. |
| 220 | 2.0 | 3.0 | 0.8 | 0.75 | 1.6 | 1.4 |
| 240 | 2.2 | 3.0 | 0.8 | 0.75 | 1.6 | 1.4 |

The results of the above Table V illustrate the effectiveness of composition (A) in both rapidly decreasing foam and controlling the formation of further foam over a long period of time with different screen room liquors. Comparisons with the commercially-available competitive product (C.P) indicates in the case of liquor I at least as good kill and superior control, in the case of liquor II better kill and comparative control, and, in the case of liquor III vastly superior kill.

EXAMPLE V

This example illustrates the defoaming properties of compositions (A) and (B) in pulp mill screen room operations.

The procedure of Example IV was repeated on a further simulated screen room liquor utilizing a slightly different apparatus design, a temperature of 75° F and 0.03 ml of compositions (A) and (B). The results are reproduced in the following Table VI:

TABLE VI

| Time (Secs.) | Foam Height (Inches) | |
|---|---|---|
| | Composition A | Composition B |
| 0 | 3 | 3 |
| 5 | 2.8 | 2.75 |
| 10 | 2.4 | 2.25 |
| 15 | 2.0 | 1.75 |
| 20 | 1.9 | 1.4 |
| 25 | 1.75 | 1.25 |
| 30 | 1.6 | 1.1 |
| 35 | 1.5 | 1.0 |
| 40 | 1.4 | 0.9 |
| 50 | 1.25 | 0.8 |
| 60 | 1.1 | 1.1 |
| 80 | 1.5 | 1.4 |
| 100 | 2.25 | 2.0 |
| 120 | 3 | 2.75 |
| 140 | 4 | 4 |
| 160 | 5.1 | 5.5 |
| 180 | 5.75 | 6.25 |
| 200 | 6.2 | 6.75 |
| 220 | 7.25 | 7.25 |

As may be seen from the results of the above Table VI, composition (B) containing the aliphatic oil provides a better foam kill with this black liquor than composition (A).

EXAMPLE VI

This example illustrates the use of composition (A) (prepared as outlined in Example I) in paper-making machine defoaming procedures.

A synthetic white water having a pH of about 4.6 to 5.0 was prepared, simulating paper making machine aqueous media, by mixing the following components in the order listed:

| Tap Water | 1,000 ml |
|---|---|
| Distilled Water | 2,890 ml |
| Pexol Size | 40 ml |
| 5% Corn Starch | 50 ml |
| 10% Alum | 20 ml |
| 37% Formaldehyde | 1 ml |

The apparatus described in Example III was operated utilizing 500 mls of the synthetic white water at 105° F. Once circulation of the liquid started, the time required for foam to completely cover the surface of the liquor was measured for liquor containing no defoamer, liquor containing 0.03 ml of composition (A) prepared as outlined in Example I and 0.03 mls of the competitive product (C.P.) mentioned in Example IV.

The results are reproduced in the following Table VII:

TABLE VII

| | Paper Making Machine Evaluations | | |
|---|---|---|---|
| | | Defoamer Product | |
| | None | A | C.P |
| Time to close (seconds) | 43 | 160 | 120 |

The results of Table VII show the effectiveness of composition (A) in preventing form formation in papermaking machine white water as compared to a competitive product.

The results of Tables IV, V, VI and VII demonstrate the versatility of the products of this invention in the control of foam in different types of pulp mill and paper mill liquors having different temperatures and pH values.

SUMMARY

The present invention therefore provides defoamer compositions which have a wide versatility and which are emulsifiable for more ready application. Modifications are possible within the scope of the invention.

What we claim is:

1. A substantially inorganic-particulate-free defoamer composition inherently capable of forming a stable oil-in-water emulsion and consisting essentially of from about 1.5 to about 12% by weight of an aliphatic diamide, said diamide being formed from a polymethylene diamine containing from 2 to 6 carbon atoms and at least one long chain aliphatic carboxylic acid containing from 12 to 22 carbon atoms, a small quantity of a silicone oil, from about 1 to about 8% by weight of an alkoxylated alkyl substituted phenol having the formula:

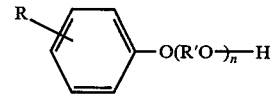

wherein R is an alkyl group containing from 8 to 10 carbon atoms, R' is an alkyl group containing two or three carbon atoms, and n is a value from greater than 4 to less than about 8, and the balance of a low viscosity mineral oil, said diamide having an average particle size from 4 to 7 on the Hegman scale and being dispersed substantially uniformly throughout said oil.

2. The composition of claim 1 wherein said diamide has an average particle size of from 5 to 6 on the Hegman scale.

3. The composition of claim 1 wherein said diamide consists predominantly of ethylene bis-stearamide.

4. The composition of claim 1 wherein said diamide is present in an amount of from about 6 to about 8% by weight.

5. The composition of claim 1 wherein there is present up to about 2% of said silicone oil.

6. The composition of claim 1 wherein said silicone oil is a dimethyl siloxane oil.

7. The composition of claim 6 wherein said alkoxylated alkyl substituted phenol has the formula:

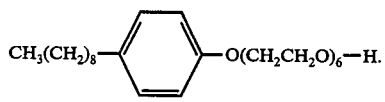

8. The composition of claim 1 wherein there is about 4.5 to about 5.5% by weight of said alkoxylated alkyl substituted phenol present.

9. The composition of claim 1 wherein there is present up to about 3% by weight of an additional spreading agent.

10. The composition of claim 9 wherein said additional spreading agent is present in an amount of from about ½ to about 1% by weight.

11. The composition of claim 1 wherein said mineral oil has a viscosity of from about 25 to about 100 SUS at 210° F and about 65 to about 215 SUS at 100° F.

12. The composition of claim 1 wherein said mineral oil has the chemical composition consisting of from about 60 to about 70% paraffinic carbon, about 25 to about 35% naphthenic carbon, about 1 to about 5% aromatic carbon, about 75 to about 95% by weight of saturates, about 5 to about 20% by weight of aromatics and less than 1.5% by weight of polar compounds.

13. A defoamer composition inherently capable of forming a stable oil-in-water emulsion and consisting of about 6.7% by weight of ethylene bis-stearamide, about 1% by weight of a calcium petroleum sulfonate having a molecular weight of about 440, about 0.5% by weight of a dimethyl siloxane oil, about 5.1% by weight of a compound of the formula:

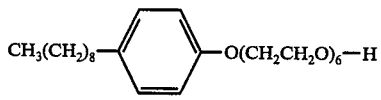

and the balance by weight of a mineral oil having a viscosity of about 40 SUS at 210° F and containing about 68% paraffinic carbons and about 90% saturates,
said amide having an average particle size from 5 to 6 on the Hegman scale and being substantially uniformly dispersed throughout said oil.

14. The composition of claim 13 wherein said dimethyl siloxane oil is a thixotropic liquid having a viscosity at 25° C of about 3100 to 3300 centistokes.

15. The composition of claim 13 wherein said dimethyl siloxane oil is a liquid having a viscosity of 50 centistokes.

16. A defoamer composition comprising a stable oil-in-water emulsion consisting of at least 50% water and the remainder a defoamer composition consisting essentially of from about 1.5 to about 12% by weight of an aliphatic diamide, said diamide being formed from a polymethylene diamine containing from 2 to 6 carbon atoms and at least one long chain aliphatic carboxylic acid containing from 12 to 22 carbon atoms, a small quantity of a silicone oil, from about 1 to about 8% by weight of an alkoxylated alkyl substituted phenol having the formula:

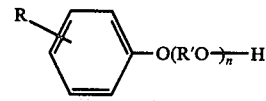

wherein R is an alkyl group containing from 8 to 10 carbon atoms, R' is an alkyl group containing two or three carbon atoms and n is a value from greater than 4 to less than about 8, and the balance of a low viscosity mineral oil, said diamide having an average particle size from 4 to 7 on the Hegman scale and being dispersed substantially uniformly throughout said oil.

17. A substantially inorganic particulate-free defoamer composition inherently capable of formation into a stable oil-in-water emulsion and consisting essentially of from about 1.5 to about 12% by weight of an aliphatic diamide, said diamide being formed from a polymethylene diamine containing from 2 to 6 carbon atoms and at least one long chain aliphatic carboxylic acid containing from 12 to 22 carbon atoms, a small quantity of a silicone oil, from about 1 to about 8% by weight of an alkoxylated alkyl substituted phenol having the formula:

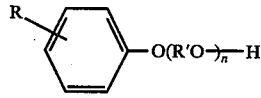

wherein R is an alkyl group containing from 8 to 10 carbon atoms, R' is an alkyl group containing two or three carbon atoms and n is a value from greater than 4 to less than about 8, about 3 to about 9% by weight of an aliphatic oil, and the balance of a low viscosity mineral oil, said diamide having an average particle size from 4 to 7 on the Hegman scale and being dispersed substantially uniformly through said oils.

18. The composition of claim 17 wherein said diamide has an average particle size of from 5 to 6 on the Hegman scale.

19. The composition of claim 17 wherein said diamide consists predominantly of ethylene bis-stearamide.

20. The composition of claim 17 wherein said diamide is present in an amount of from about 6 to about 8% by weight.

21. The composition of claim 17 wherein there is present up to about 2% of said silicone oil.

22. The composition of claim 17 wherein said silicone oil is a dimethyl siloxane oil.

23. The composition of claim 17 wherein said alkoxylated alkyl substituted phenol has the formula:

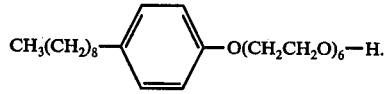

24. The composition of claim 17 wherein there is about 4.5 to about 5.5% by weight of said alkoxylated alkyl substituted phenol present.

25. The composition of claim 17 wherein there is present up to about 3% by weight of an additional spreading agent.

26. The composition of claim 25 wherein said additional spreading agent is present in an amount of from about ½ to about 1% by weight.

27. The composition of claim 17 wherein said aliphatic oil is present in an amount of from about 5 to about 7% by weight.

28. The composition of claim 17 wherein said aliphatic oil has a viscosity of about 50 centistokes, is substantially odor-free and has a flash point of about 125° F.

29. The composition of claim 17 wherein said aliphatic oil has a viscosity and is present in sufficient quantity to provide an overall viscosity of said composition of about 400 to about 1000 centipoise.

30. The composition of claim 17 wherein said aliphatic oil is substantially odorless and has a flash point greater than 120° F.

31. The composition of claim 17 wherein said mineral oil has a viscosity of from about 25 to about 100 SUS at 210° F and about 65 to about 215 SUS at 100° F.

32. The composition of claim 17 wherein said mineral oil has the chemical composition consisting of from about 60 to about 70% paraffinic carbon, about 25 to about 35% naphthenic carbon, about 1 to about 5% aromatic carbon, about 75 to about 95% by weight of saturates, about 5 to about 20% by weight of aromatics and less than 1.5% by weight of polar compounds.

33. A defoamer composition inherently capable of forming a stable oil-in-water emulsion and consisting essentially of about 6.2% by weight of ethylene bis-stearamide, about 0.9% by weight of a calcium petroleum sulfonate having a molecular weight of about 440, about 0.5% of a dimethyl siloxane oil, about 4.8% of a compound of the formula:

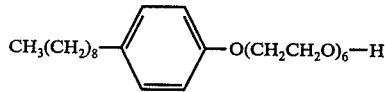

about 6.0% of an aliphatic oil, and the balance of a mineral oil having a viscosity of about 40 SUS at 210° F and containing about 68% paraffinic carbons and about 90% saturates, said amide having an average particle size from 5 to 6 on the Hegman scale and being substantially uniformly dispersed throughout said oils.

34. The defoamer composition of claim 33, wherein said dimethyl siloxane oil is a thixotropic liquid having a viscosity at 25° C of about 3100 to 3300 centistokes.

35. The defoamer composition of claim 33, wherein said dimethyl siloxane oil is a liquid having a viscosity of 50 centistokes.

36. A method for the control of foam in an aqueous liquor having a tendency to foam which comprises treating said liquor with a substantially inorganic-particulate-free defoamer composition consisting essentially of from about 1.5 to about 12% by weight of an aliphatic diamide, said diamide being formed from a polymethylene diamine containing from 2 to 6 carbon atoms and at least one long chain aliphatic carboxylic acid containing from 12 to 22 carbon atoms, a small quantity of a silicone oil, from about 1 to about 8% by weight of an alkoxylated alkyl substituted phenol having the formula:

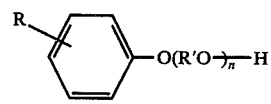

wherein R is an alkyl group containing from 8 to 10 carbon atoms, R' is an alkyl group containing two or three carbon atoms and $n$ is a value from greater than 4 to less than about 8, and the balance of a low viscosity mineral oil, said diamide having an average particle size from 4 to 7 on the Hegman scale and being dispersed substantially uniformly throughout said oil.

37. The method of claim 36 wherein said aqueous liquor is a pulp or paper mill aqueous liquor having a pH of about 4 to 12 and said method is carried out at a temperature of about 32° F to the boiling point of the liquor.

38. The method of claim 37 wherein said aqueous liquor is a pulp mill black liquor.

39. The method of claim 37 wherein said aqueous liquor is a pulp mill screen room liquor.

40. The method of claim 37 wherein said aqueous liquor is a paper mill paper-making machine liquor.

41. The method of claim 38 wherein from about 0.5 to about 2 lbs. of said composition per ton of pulp is dispersed in said black liquor.

42. The method of claim 39 wherein from about 0.5 to about 2 lbs. of said composition per ton of pulp is dispersed in said screen room liquor.

43. The method of claim 40 wherein from about 0.5 to about 3 lbs. of said composition per ton of pulp is dispersed in said paper making machine liquor.

44. The method of claim 36 wherein said aqueous liquor is a foamable industrial effluent.

45. The method of claim 36 wherein said composition is used as a stable oil-in-water emulsion and said emulsion is substantially uniformly dispersed in said aqueous liquor.

46. The method of claim 45 wherein said emulsion has a concentration of about 5% v/v.

47. A method for the control of foam in an aqueous liquor having a tendency to foam which comprises treating said liquor with a substantially inorganic-particulate-free defoamer composition consisting essentially of from about 1.5 to about 12% by weight of an aliphatic diamide, said diamide being formed from a polymethylene diamine containing from 2 to 6 carbon atoms and at least one long chain aliphatic carboxylic acid containing from 12 to 22 carbon atoms, a small quantity of a silicone oil, from about 1 to about 8% by weight of an alkoxylated alkyl substituted phenol having the formula:

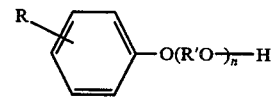

wherein R is an alkyl group containing from 8 to 10 carbon atoms, R' is an alkyl group containing two or three carbon atoms and $n$ is a value from greater than 4 to less than about 8, about 3 to about 9% by weight of an aliphatic oil, and the balance of a low viscosity mineral oil, said diamide having an average particle size from 4 to 7 on the Hegman scale and being dispersed substantially uniformly through said oils.

48. The method of claim 47 wherein said aqueous liquor is a pulp or paper mill aqueous liquor having a pH of about 4 to 12 and said method is carried out at a temperature of about 32° F to the boiling point of the liquor.

49. The method of claim 48 wherein said aqueous liquor is a pulp mill black liquor.

50. The method of claim 48 wherein said aqueous liquor is a pulp mill screen room liquor.

51. The method of claim 48 wherein said aqueous liquor is a paper mill paper-making machine liquor.

52. The method of claim 49 wherein from about 0.5 to about 2 lbs. of said composition per ton of pulp is dispersed in said black liquor.

53. The method of claim 50 wherein from about 0.5 to about 2 lbs. of said composition per ton of pulp is dispersed in said screen room liquor.

54. The method of claim 51 wherein from about 0.5 to about 3 lbs of said composition per ton of pulp is dispersed in said paper making machine liquor.

55. The method of claim 47 wherein said aqueous liquor is a foamable industrial effluent.

56. The method of claim 47 wherein said composition is used as a stable oil-in-water emulsion and said emulsion is substantially uniformly dispersed in said aqueous liquor.

57. The method of claim 56 wherein said emulsion has a concentration of about 5% v/v.

* * * * *